INVENTOR.
Charles H. Grant
BY
ATTORNEY

United States Patent Office 3,475,238
Patented Oct. 28, 1969

3,475,238
METHOD FOR PREPARING GELLED SLURRY EXPLOSIVE COMPOSITIONS CONTAINING DISTINCT LIQUID AND SOLID PHASES
Charles H. Grant, Midland, Mich., assignor to The Dow Chemical Company, Midland, Mich., a corporation of Delaware
Filed Feb. 14, 1968, Ser. No. 705,523
Int. Cl. C06b 19/04, 1/00
U.S. Cl. 149—109    1 Claim

ABSTRACT OF THE DISCLOSURE

A method for preparing gelled slurry explosive compositions characterized as containing separate liquid and particulate phases intimately mixed together. The liquid phase is prepared and a gelling agent of at least one natural gum is added thereto. An acid is added to the liquid phase to adjust the pH to an acidic range. A short time prior to detonation of the explosive, solid particulate constituents are dispersed in the liquid phase followed by crosslinking the gum by raising the pH of the composition.

BACKGROUND

Slurry explosive compositions usually consist of a separate particulate solid phase and a separate liquid phase intimately mixed together. To assure that the particulate phase is evenly distributed throughout the liquid phase various gelling and thickening agents are also usually employed in amounts usually ranging from about 0.5 to about 5 percent by weight of the total slurry composition. Any of a variety of water-resistant natural gums and synthetic gelling agents can be employed. These gelling agents are adequate if the compositions are to be employed within a relatively short period of time after their preparation, usually within 5 to 8 days. However, the natural gums, e.g., guar, karaya and mixtures thereof, tend to overcrosslink upon standing due to the rise in the pH of the composition due to the generation of free ammonia. Upon overcrosslinking the compositions start to deteriorate and break down, thus destroying their effectiveness as an explosive.

The present invention overcomes the disadvantages associated with these slurry compositions by a novel method of preparing slurry explosive compositions.

SUMMARY

The present invention concerns a method of preparing gelled slurry explosive compositions characterized as containing separate liquid and solid particulate phases and including a natural gum as a gelling agent. The method comprises preparing the liquid phase of the composition; introducing a gum into the liquid phase; adding an acid to the liquid phase in an amount sufficient to make it acidic so as to prevent the ready crosslinking of the gum; adding the solid particulate constituents to the liquid phase within a short time period prior to use of the explosive and if desired crosslinking the gum by raising the pH of the composition by adding an alkaline agent such as a solution of anhydrous ammonium saturated with ammonium nitrate (Divers liquid).

DRAWINGS

Figure 1:
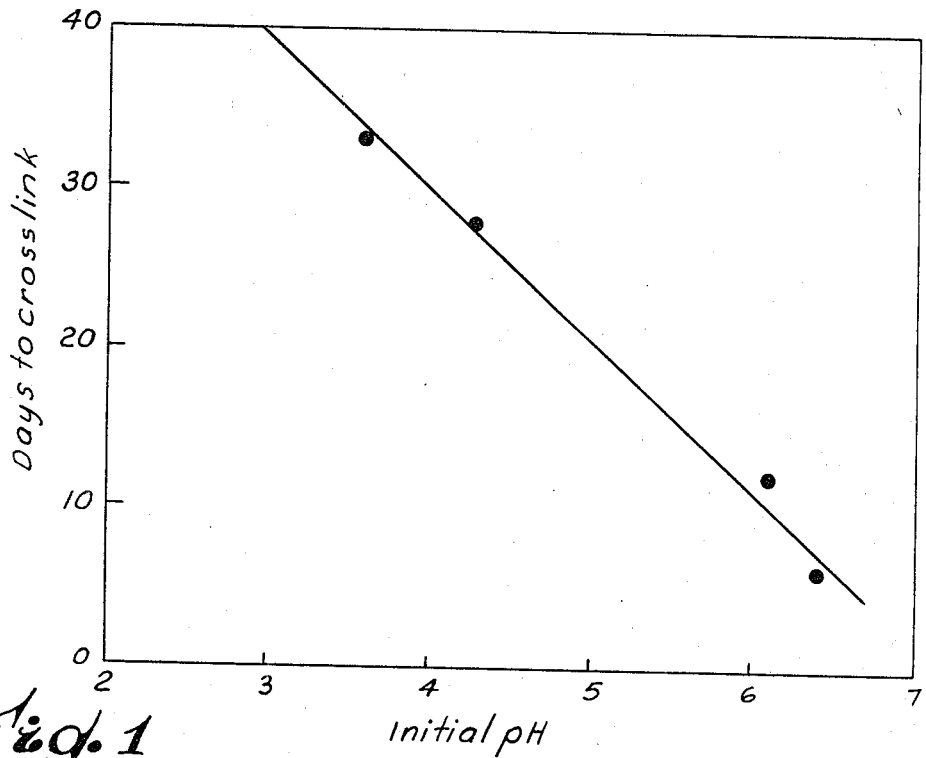
Figure 2:
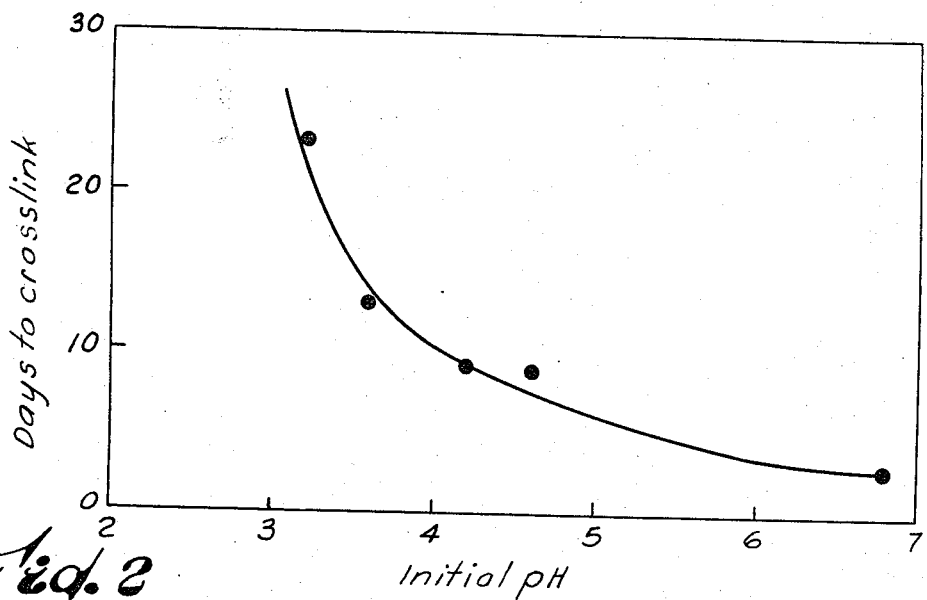

FIGURES 1 and 2 represent graphic comparisons of the initial pH of two solutions employed in the preparation of a slurry explosive composition, versus the number of days for the gum in the solution to crosslink.

PREFERRED EMBODIMENTS

Usually, in the practice of the present method a slurry explosive composition, containing at least one particulate inorganic oxidizing salt, a sensitizer and a fluid phase is prepared in the following manner. The initial fluid phase is prepared in a manner known to the art. For example, a specific quantity of an inorganic oxidizing salt is dissolved in water alone or in the presence of other fluid constituents such as, for example, petrolic liquids, organic liquid extenders and the like. In accord with the present invention, the gelling agent, consisting of a natural gum, is then intimately mixed with the fluid phase and the pH of the solution is adjusted to within a range of from about 3 to about 6.5 by the addition of a strong mineral acid such an hydrochloric and nitric acid. The indicated solutions can be stored for considerable lengths of time without the gum crosslinking and are safe for shipment to different locations and the like. Prior to the intended use of the slurry explosive, the solution is admixed with the required quantity of solid particulate constituents such as, for example, ammonium nitrate and a light metal fuel to provide an explosive composition. The gum can then be quickly crosslinked by the addition of a small amount of an alkaline agent such as, for example, an ammonical solution saturated with ammonium nitrate.

The novel method of the present invention may be used for preparing slurry explosive compositions which are well known in the art and in which a natural gum is employed as a gelling agent. These slurries usually contain as essential constituents an inorganic oxidizing salt, a sensitizer and water.

Examples of salts include ammonium, alkali metal and alkaline earth metal nitrates, and perchlorates. Specific examples of commonly employed salts are ammonium nitrate, ammonium perchlorate, sodium nitrate, sodium perchlorate, potassium nitrate, potassium perchlorate, magnesium nitrate, magnesium perchlorate, calcium nitrate, other like salts and mixtures thereof. Usually the explosive composition contains from about 10 percent to about 90 percent by weight of the inorganic salts. Preferably at least one of the inorganic oxidizing salts is ammonium nitrate.

Examples of suitable sensitizers include high explosives such as TNT, smokeless powder, PETN, RDX, pentolite and other nitrated high explosives; metallic sensitizers such as, for example, particulate aluminum magnesium silicon, iron, ferro-silicon, ferro-phosphorus, magnesium-aluminum alloys and the like; and carbonaceous materials, such as finely divided carbon, corn starch, sugar, petrolic liquids such as crude oil and liquid hydrocarbons derived therefrom, formamide, glycols, urea, and the like. The carbonaceous materials are usually employed in an amount up to about 20 percent by weight of the explosive compositions. Metallic sensitizers usually range in size from about 4 mesh to about 200 mesh and are usually employed in amounts up to about 50 percent and more by weight of the explosive composition. Various combinations of sensitizers can also be employed such as, for example, metallic fuels and fuel oils are commonly used together and high explosives such as, for example, smokeless powder and metallic fuels are employed in the same explosive composition. Other sensitizers include sulfur and sodium nitrate. The latter, when employed in specific proportions, sensitizes the compositions as well as acts as an oxidizer.

The method of the present invention may be specifically employed to prepare the explosive compositions defined in U.S. Patents Nos. 2,992,913; 3,091,559; 3,094,443; and 3,287,189.

An example of a particularly useful slurry explosive composition which may be prepared by the method of the present invention is disclosed in U.S. Patent No. 3,307,896, issued Mar. 7, 1967, to Grant. The explosive composition disclosed by Grant consists of ammonium nitrate from 0 to about 85 percent; alkali metal nitrate to about 60 percent; particulate aluminum from about 5 to about 40 percent; water from about 5 to 25 percent, and a gelling agent from about 0.2 to about 2.5 percent. A preferred gelled explosive composition is disclosed consisting of sodium nitrate from about 5 to about 40 percent; ammonium nitrate from about 15 to about 85 percent; particulate aluminum from about 10 to about 30 percent; water from about 6 to about 16 percent; liquid water-miscible liquid extenders from about 2 to about 16 percent; and a water swellable hydrophobic, crosslinkable gum from about 0.5 to about 1.5 percent, and crosslinking agent.

The particulate aluminum employed in the explosive composition usually ranges from about 4 to about 150 mesh U.S. Standard Sieve and has a gauge (thickness) of from about 0.25 to about 30 mils. The metal is further characterized in having a particle size distribution wherein from about 60 to about 80 percent of the aluminum is from about 12 to 50 mesh the balance being substantially 50 to 100 mesh and wherein from about 5 to 10 percent of the particles have a gauge of up to 1 mil, from about 70 to about 80 percent have a gauge of to about 10 mils and the balance are substantially from 10 to about 30 mils in gauge.

Ordinarily, the aluminum metal employed has a particle size and gauge distribution as set forth in Table I:

TABLE I

| Metal particle size (U.S. Standard Sieve): | Distribution (percent) |
|---|---|
| 30–50 mesh | 60–70 |
| 50–100 mesh | 25–35 |
| 100–150 mesh | About 5 |
| Metal gauge: | |
| Up to 1 mil | 6–8 |
| 1 to 5 mils | 14–17 |
| 5 to 10 mils | 73–77 |
| 10 to 15 mils | 3–7 |
| >15 mils | <.1 |

Preferably the metal ranges from about 0.025 to about 5 mils in gauge.

"Aluminum" is meant to include both aluminum and aluminum alloys containing at least about 60 percent by weight aluminum.

Liquid organic fluid extenders which ordinarily are employed are those having a favorable carbon-oxygen ratio such that there is no detrimental competition of the carbon with the metal for available oxygen in the system. Monohydroxy alkanols containing from 1 to about 4 carbon atoms, ethylene and diethylene glycol, propylene glycol, glycerol and formamide are used as extenders or diluents in the explosive composition. Ordinarily, formamide, which has a low carbon content and relatively high boiling point is utilized as the liquid extender.

Ordinarily, from about 5 to about 40 percent and preferably from about 12 to about 35 percent of the total weight of ammonium nitrate is present as a solid, particulate grained material passing a 20 mesh U.S. Standard Sieve. While ammonium nitrate is usually present as the oxidizer, at least a part of the ammonium nitrate may be replaced by sodium, lithium, potassium or other alkali metal nitrates if desired, to obtain increased or decreased density, sensitivity or other properties.

The composition as defined in U.S. Patent No. 3,307,986 may be prepared, for example, by dispersing a natural gum, e.g., guar gum, in an ammonium nitrate-formamide solution to which is added water. This solution has been found to gel, i.e., the gum will crosslink, within a relatively short time usually less than 5 days, making it useless for subsequent dispersion and suspension of solid fuel and oxidizing agents. The shelf life of this solution can now be greatly extended by employing the method of the present invention wherein the pH of the solution is adjusted with nitric acid. A pH range of from about 3 to about 6.5 is usually sufficient to prevent the crosslinking of the gum for a substantial period of time. This solution can then be employed to disperse the particulate solid inorganic salts and metal and crosslinked by the addition of Divers liquid.

As an alternative embodiment of the present invention, the liquid phase, as heretobefore described, can be allowed to crosslink prior to the addition of the particulate constituents. The gel is then broken down, i.e., the crosslinking of the gum is reversed, by the addition of aqueous nitric acid or by contacting it with the vapors of fuming nitric acid. After the gelled solution has been broken down, the particulate constituents can be dispersed in the resulting solution and can be quickly re-crosslinked, for example, by the addition of Divers liquid to provide a gelled slurry explosive composition.

Acids which may be employed in the embodiments of the present invention consist of strong mineral acids such as aqueous hydrochloric acid, acetic acid, nitric acid, and the like. However, nitric acid is usually preferred since it also has beneficial properties as a sensitizer in the prepared slurry explosive compositions.

The following examples will facilitate a more complete understanding of the present invention but are not meant to limit it thereto.

Example I

To illustrate the effect of pH on the crosslinking time of a liquid phase of an explosive composition the following tests were run. A basic liquid phase, in paste form, was prepared containing the following constituents as parts by weight:

| | |
|---|---|
| Formamide | 10.00 |
| Ammonium nitrate (prills) | 5.00 |
| Guar gum | 0.8 |
| $H_2O$ (and acid total) | 11.00 |

The pH of various samples of the solution was adjusted by the substitution of aqueous nitric acid (about 5 molar) for a portion of the water. The time in days for the solution to gell (observed as not flowable) was observed and the results are tabulated in the following Table II and graphically illustrated in FIGURE 1.

TABLE II

| Sample Number: | Initial pH | Days to Gel |
|---|---|---|
| 1 | [1] 66.6 | 3 |
| 2 | 6.4 | 6 |
| 3 | 6.1 | 12 |
| 4 | 4.3 | 28 |
| 5 | 3.6 | 33 |

[1] No acid.

Example II

Another paste was prepared which contained the following constituents as parts by weight:

| | |
|---|---|
| Formamide | 10.00 |
| Ammonium nitrate (prills) | 5.00 |
| Guar gum | 0.80 |
| Water (and acid total) | 11.00 |
| Sodium nitrate (prills) | 10.00 |

The pH of various samples of the solution was adjusted by the substitution of aqueous nitric acid (about 5 molar) for a portion of the water. The time, in days, for the solution to gel was observed and the results tabulated in following Table III and graphically illustrated in FIGURE 2.

TABLE III

| Sample Number: | Initial pH | Days to Gell |
|---|---|---|
| 1 | [1] 6.8 | 3 |
| 2 | 4.6 | 7 |
| 3 | 4.2 | 7 |
| 4 | 3.6 | 13 |
| 5 | 3.2 | 23 |

[1] No acid.

Both of the examples illustrate that the crosslinking time of solutions employed in preparing explosive compositions can be greatly increased by acidifying the solutions by the addition of aqueous nitric acid. The crosslinking time of other solutions employed in the preparation of slurry explosive compositions and containing a gum such as karaya, guar and karaya mixtures can be increased in a like manner. Likewise, the solutions may be gelled at any desired time by the addition of a crosslinking agent to the solution such as, for example, Divers liquid.

Various modifications may be made in the present invention without departing from the spirit or scope thereof for it is understood that we are limited only as defined in the appended claim.

I claim:

1. A method for preparing gelled slurry explosive compositions containing distinct liquid and solid phases and containing a natural gum as a gelling agent which comprises:
   (a) preparing the liquid phase and including therein a gelling agent consisting of a natural gum;
   (b) allowing the gelling agent to crosslink to provide a gelled solution;
   (c) contacting the gelled solution with a sufficient quantity of a strong mineral acid to break down the crosslinked gum prior to the use of the slurry explosive composition;
   (d) dispersing the particulate phase into the liquid phase; and
   (e) recrosslinking the gum to provide a gelled slurry explosive composition.

References Cited
UNITED STATES PATENTS

| | | | |
|---|---|---|---|
| 3,160,538 | 12/1964 | Zaslowsky et al. | 149—60 X |
| 3,261,732 | 7/1966 | Eilo | 149—44 X |
| 3,235,423 | 2/1966 | Ferguson | 149—44 X |
| 3,307,986 | 3/1967 | Grant | 149—44 X |
| 3,312,578 | 4/1967 | Craig et al. | 149—44 X |
| 3,333,998 | 8/1967 | Ferguson | 149—44 X |
| 3,337,380 | 8/1967 | Griffith | 149—44 X |
| 3,341,383 | 9/1967 | Bergwerk | 149—60 |
| 3,350,246 | 10/1967 | Fee et al. | 149—60 |
| 3,355,336 | 11/1967 | Lyerly | 149—60 |
| 3,356,545 | 12/1967 | Ferguson | 149—44 X |

BENJAMIN R. PADGETT, Primary Examiner

S. J. LECHERT, Assistant Examiner

U.S. Cl. X.R.

149—44, 60, 61, 74, 76, 83, 85